United States Patent [19]

Hamren

[11] Patent Number: 4,711,119
[45] Date of Patent: Dec. 8, 1987

[54] PEAK COMBUSTION PRESSURE SIGNAL PROCESSING CIRCUIT WITH DIAGNOSTIC CAPABILITY

[75] Inventor: Glen C. Hamren, Greentown, Ind.

[73] Assignee: General Motors Corporation, Detroit, Mich.

[21] Appl. No.: 939,184

[22] Filed: Dec. 8, 1986

[51] Int. Cl.⁴ .............................................. G01M 15/00
[52] U.S. Cl. ........................................... 73/115; 73/709
[58] Field of Search ........................ 73/115, 35, 709; 364/431.3, 431.4, 431.5; 123/494

[56] References Cited

U.S. PATENT DOCUMENTS

| | | | |
|---|---|---|---|
| 3,957,023 | 5/1976 | Peterson | 123/177 R |
| 4,406,265 | 9/1983 | Brandt et al. | 123/425 |
| 4,481,925 | 11/1984 | Karau et al. | 123/425 |
| 4,539,841 | 9/1985 | Schroeder et al. | 73/115 X |

Primary Examiner—Jerry W. Myracle
Attorney, Agent, or Firm—Robert M. Sigler

[57] ABSTRACT

A peak combustion pressure signal processing circuit for an internal combustion engine having a plurality of combustion chambers with combustion pressure sensors includes an operational amplifier for each sensor with an output connected through a diode to a common junction. Each operational amplifier has a feedback circuit from the common junction to its input effective to cause its output voltage to decrease so as to reverse bias its output diode when the voltage on the common junction exceeds the voltage derived from the associated sensor, whereby only the diode passing the maximum combustion pressure signal is forward biased. A logic circuit having inputs from the common junction and the outputs of at least all but one of the operational amplifiers determines which diode is forward biased and assumes a uniquely identifiable output state.

3 Claims, 5 Drawing Figures

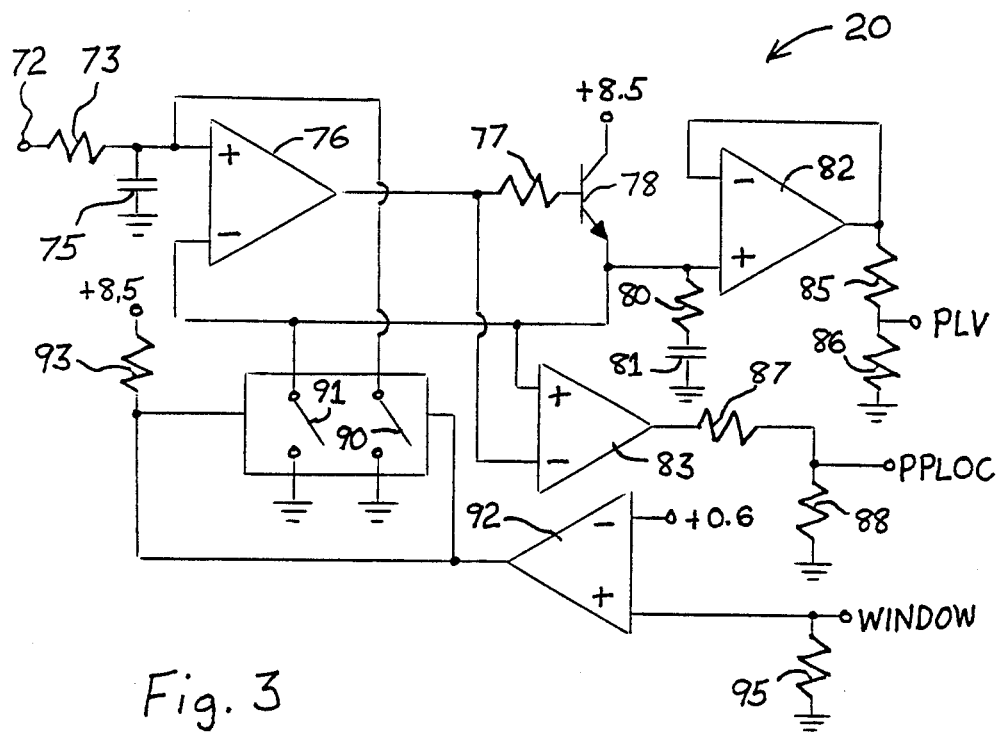
Fig. 3
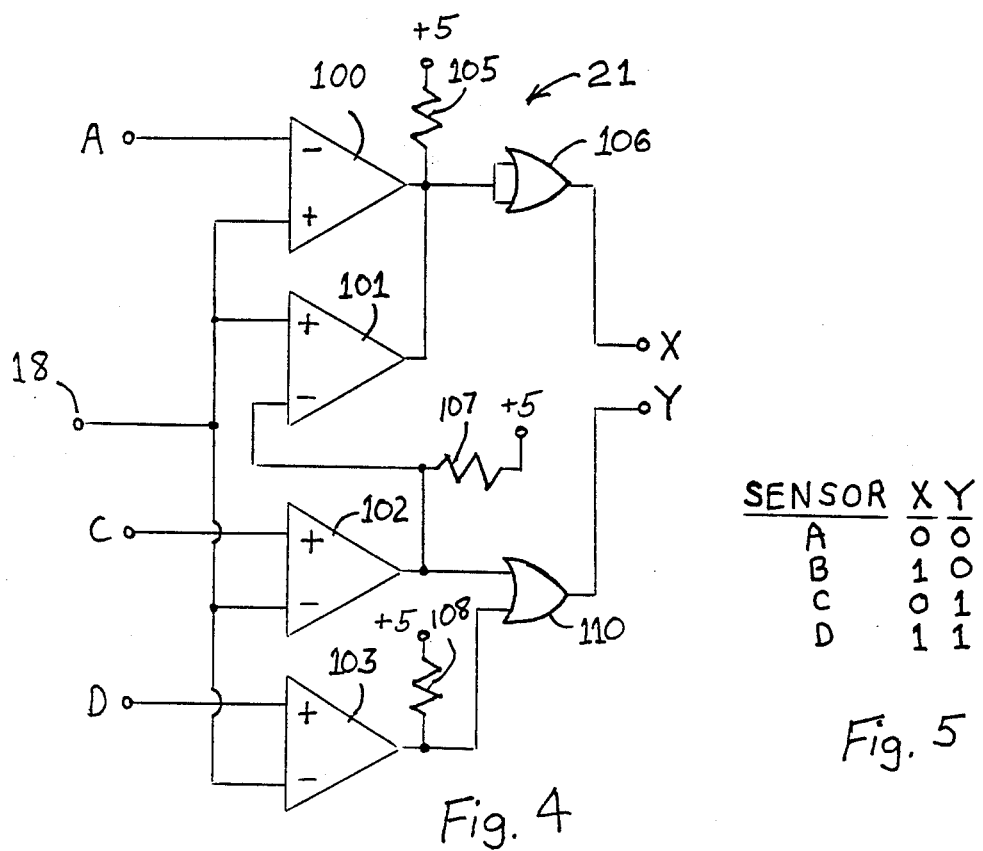
Fig. 4
| SENSOR | X | Y |
|---|---|---|
| A | 0 | 0 |
| B | 1 | 0 |
| C | 0 | 1 |
| D | 1 | 1 |
Fig. 5

PEAK COMBUSTION PRESSURE SIGNAL PROCESSING CIRCUIT WITH DIAGNOSTIC CAPABILITY

BACKGROUND OF THE INVENTION

This invention relates to location of peak pressure (LPP) ignition timing apparatus for an internal combustion engine and particularly for a peak combustion pressure signal processing circuit for use in such apparatus which has the capability of indicating certain information useful for diagnostic services.

An LPP ignition timing control generally includes a plurality of combustion pressure sensors connected by cables to a processing circuit. There are several possible failures of LPP sensor or cables which may affect the operation of the apparatus: an inoperative sensor, a loose connection, a misconnection, a bad cable, etc. In addition, the sensor information provides the opportunity for sensing certain engine malfunctions in the nature of misfire of individual combustion chambers.

SUMMARY OF THE INVENTION

The invention provides, in a peak combustion pressure signal processing circuit for an internal combustion engine, an operational amplifier for each sensor having an input receiving a voltage derived from the sensor and an output connected through a diode to a common junction to produce a voltage representing the highest combustion pressure of the engine at the common junction. Each operational amplifier has a feedback circuit from the common junction to its input effective to cause its output voltage to decrease by more than a diode drop so as to reverse bias its output diode when the voltage on the common junction exceeds the voltage derived from the associated sensor. The result is that only the diode passing the signal derived from the sensor sensing the maximum combustion pressure is forward biased and all the other diodes are reverse biased. A logic circuit having inputs from the common junction and the outputs of at least all but one of the operational amplifiers is effective to compare the voltage levels of the outputs of the operational amplifiers to the voltage on the common junction and thus determine which diode is forward biased. The logic circuit is constructed to define a uniquely identifiable state for each forward biased diode to indicate which combustion chamber has the maximum combustion pressure.

From the identification of the combustion chamber with maximum combustion chamber pressure, along with additional information from the ignition system such as rotational crankshaft position and identification of the combustion chamber which is supposed to be firing, the diagnostic information discussed above may be determined. Further details and advantages of this invention will be apparent from the accompanying drawings and following description of a preferred embodiment.

BRIEF DESCRIPTION OF THE DRAWINGS

FIG. 3 shows a peak detector circuit.

FIG. 4 shows a logic circuit for detecting the forward biased diode.

FIG. 5 is a truth table for the logic circuit of FIG. 4.

DESCRIPTION OF THE PREFERRED EMBODIMENT

Figure 1:
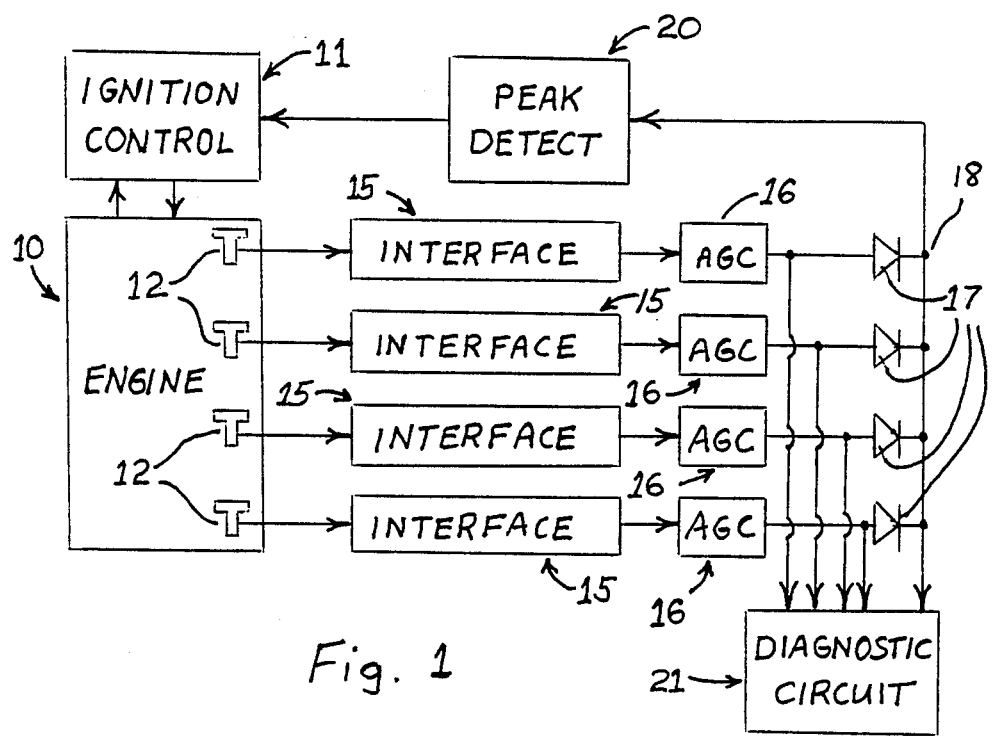
FIG. 1 is a block diagram showing the overall layout of the claimed invention.

Referring to FIG. 1, an internal combustion engine 10 is of normal construction with a block, head, crankshaft and plurality of combustion chambers (4 in this embodiment). Engine 10 includes an ignition control 11 comprising, for example, spark plugs for the combustion chambers, ignition circuitry, distributor, and a timing reference generator of the type having a member rotating with the crankshaft and apparatus effective to generate pulses as the crankshaft rotates. From the latter apparatus, the ignition control derives the rotational speed of the crankshaft and a reference crankshaft position for each combustion chamber, from which the control knows at all times the rotational crankshaft position. Ignition control 11 may further include a digital computer programmed for control of the ignition timing and/or other characteristics. An example of an engine and ignition control of this type is shown in U.S. Pat. No. 4,231,091 to Motz, issued Oct. 28, 1980. Ignition control 11 may also include a knock control, if desired, of the type known in the prior art which responds to signals of a characteristic knock frequency to modify ignition timing from the normal value to reduce knock as required.

The combustion chamber pressure for each cylinder of engine 10 is sensed by one of a plurality of pressure sensors 12, which may be of the type comprising an engine headbolt with a head adapted to be strained by the stress of combustion pressure in the engine head. An example of such a sensor is shown in U.S. Pat. No. 4,491,010 to Brandt et al, issued Jan. 1, 1985. Other usable sensors include, not exclusively, piezoelectric force rings mounted under normal headbolts or combined with the spark plugs and separate piezoelectric or other capacitive sensors directly or indirectly sensing combustion chamber pressure.

Four such sensors are shown in this embodiment; and they are distributed so that at least one is adjacent each combustion chamber of engine 10. Each sensor 12 generates an electrical output signal from a piezoelectric generator, which signal appears on an output terminal connected through a low impedance interface circuit 15, an AGC circuit 16 and a diode 17 to a junction 18 of a highest wins network. The largest signal voltage, which during a combustion event will be the pressure of the cylinder undergoing combustion, is provided to a peak detector 20 capable of detecting at least the timing and optionally the value of peak combustion pressure. The output (or outputs) of peak detector 20 are fed back to ignition control 11 in an LPP ignition timing control of the general type shown in U.S. Pat. Nos. 4,481,925 to Karau et al, issued Nov. 13, 1984, 4,596,218 to Karau et al, issued June 24, 1986, or U.S. Pat. No. 4,601,197 to Fattic et al, issued July 22, 1986, in which ignition timing is continually adjusted, when possible, to maintain peak combustion pressure at a predetermined crankshaft angle. In addition, the outputs of AGC circuits 16 are provided, along with the highest wins signal from junction 18, to a diagnostic circuit 21 capable of providing some useful diagnostic information about the operation of engine 10, ignition control 11, sensors 12 and their connectors and cables, not shown. The outputs of interface circuits 15 may also be provided to the knock control if one is used.

Figure 2:
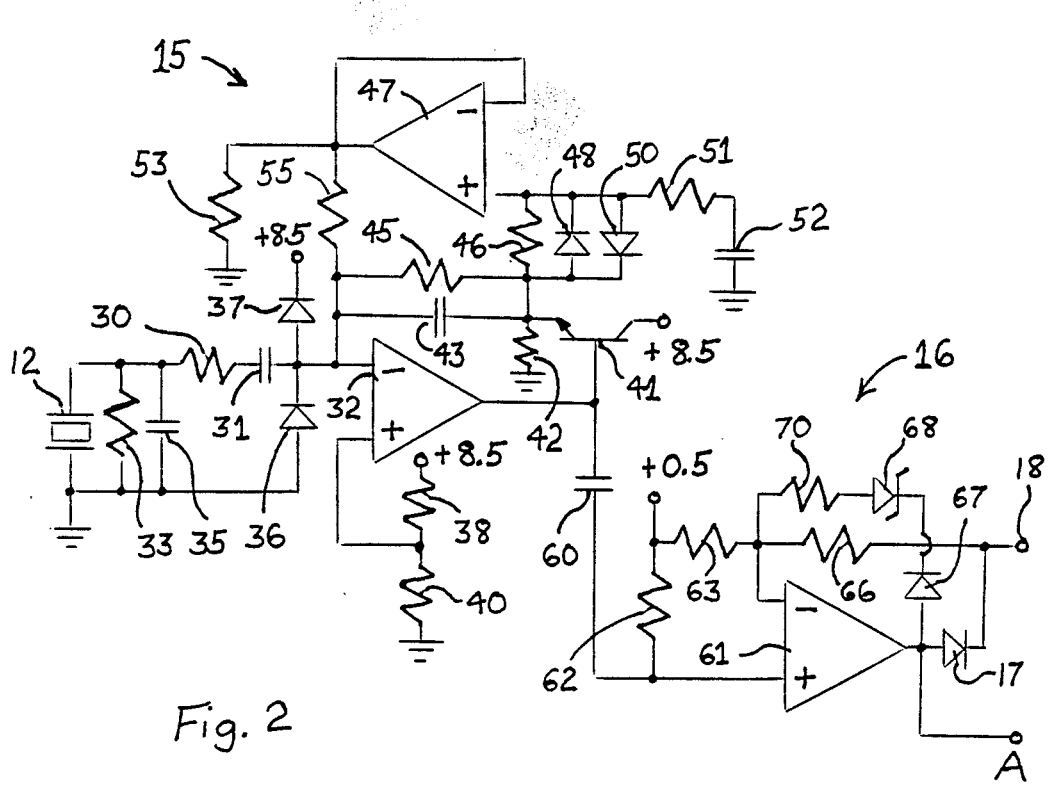
FIG. 2 shows one of the interface and AGC circuits of FIG. 1

FIG. 2 shows one of the interface circuits 15 and one of the AGC circuits 16. Interface circuit 15 is designed to present a low impedance to sensor 12 but maintain a bandwidth of 0.5 Hz to 20 KHz in the case of a system with LPP and knock sensing or 0.5 Hz to several KHz in the case of LPP only. Sensor 12 comprises, in equivalent circuit terms, a voltage source with a series capacitance of about 3900 pF. Sensor 12, symbolized by a piezoelectric element to stress the capacitance, has a grounded terminal and an output terminal connected through a resistor 30 (300) and DC blocking capacitor 31 (10 uF) to the inverting input of an operational amplifier (op amp) 32 (DM124). A resistor 33 (51K) to provide a dC ground for the high side of sensor 12 and a low pass filter capacitor 35 (0.001) are connected in parallel across sensor 12 as shown. The low pass filter 33, 35 has a high cutoff frequency to suppress high frequency noise and introduces no phase shift to the signals from sensors 12. Diode 36 from ground to the inverting input of op amp 32 and diode 37 from the inverting input to +8.5 volts provide input voltage limiting for the protection of op amp 32. The non-inverting input of op amp 32 is connected to the midpoint of a 50 percent voltage divider comprising series resistors 38 and 40 (15K) connected between +8.5 volts and ground to set the DC operating voltage for op amp 32 at 4.25 volts.

The output of op amp 32 is connected to the base of an NPN transistor 41 (2N4401) having a collector connected to +8.5 volts and an emitter connected through a resistor 42 (2K) to ground and also through a feedback capacitor 43 (0.1uf) to the inverting input of op amp 32. There is a resistor 45 (10M) in parallel with capacitor 43 for amplifier stability. The emitter of transistor 41 is further connected through a resistor 46 (910K) to the non-inverting input of a voltage follower op amp 47 (2904) having an output connected in feedback to its inverting input. Oppositely directed diodes 48 and 50 are connected in parallel across resistor 46; and the non-inverting input of op amp 47 is connected through a resistor 51 (1K) and series capacitor 52 (100uF) to ground. The output of op amp 47 is connected through a resistor 53 (2K) to ground and through a resistor 55 (15K) to the inverting input of op amp 32.

Interface circuit 15 is designed to present a low impedance to sensor 15 so that the interconnecting cable will not act as an antenna in the noisy RFI environment of a vehicle engine and ignition system. The 10 uF capacitance of DC blocking capacitor 31 is much greater than the 3900 pF equivalent series capacitance of sensor 12, so that the closed loop gain of op amp 32 is determined by the ratio of sensor capacitance to feedback capacitance. Since the former is much less than the latter, the overall closed loop gain is much less than one. Thus, amplifier saturation is not a problem in the circuit.

The circuit uses resistor 46 and capacitor 52 as a low pass filter to average the output voltage of op amp 32 and feed it back to the input through the follower op amp 47 to maintain the DC voltage level constant as determined by the junction of resistors 38 and 40. Since the signal bandwidth of the circuit must extend downward to 0.5 Hz, the low pass filter for DC must have a long time constant—thus the large values for resistor 46 and capacitor 52. However, it is helpful when the system is started to speed up the charging of capacitor 52, as well as that of DC blocking capacitor 31. Therefore, transistor 41 provides a current multiplying effect through diode 48, which bypasses resistor 46 for faster charging of capacitor 52 until its voltage rises to within a diode drop of the desired voltage, resistor 51 providing a reduced current limitation. The faster charging also applies through the action of voltage follower 47 to capacitor 31. Resistor 55 prevents the input of op amp 32 from seeing the low output impedance of op amp 47 but must be small enough to allow the quick charging of capacitor 31 when the system is started. The goal of the circuit, once it is started and the voltage on the capacitors is up to the desired level, is that the DC level determining elements (46, 52, 47) do not affect the AC path of the signal processing elements (12, 32, 43). The signal causes the output of op amp 32 to vary in voltage according to the combustion pressure waveform without disturbing the DC or average voltage level of the circuit.

The output of interface circuit 15, which is the output of op amp 32, is connected through a DC blocking capacitor 60 (4.7uF) to the non-inverting input of an op amp 61 (DM124), which input is also tied through a resistor 62 (330K) to +0.5 volts. These elements provide a lowered reference voltage of 0.5 volts for the signal for more headroom, since it is the area of the pressure curve near the peak which is to be preserved and the lower portion of the pressure curve is expendable. The inverting input of op amp 61 is also connected through a resistor 63 (5.1K) to +0.5 volts. The output of op amp 61 is connected to a diagnostic output terminal A and is also connected in feedback to the inverting input through diode 17 and resistor 66 (200K) in series. The output is further connected in feedback to the inverting input through a diode 67, zener diode 68 and resistor 70 (51K) in series. The cathode of diode 17 is the signal output 18 to peak detector 20. Thus, a compound feedback loop is provided for a reduction in gain for signals exceeding the voltage of the zener diode. This further assists the circuit in preventing clipping of the peak of large pressure curves. Although it distorts the amplitude of large pressure peaks, there is only a two valued choice of gain parameters; and a signal may be derived from the voltage across diode 67 or zener diode 68 to trigger an amplitude correction factor in any circuitry that makes use of the amplitude information.

Peak detect circuit 20 is shown in FIG. 3. An input terminal 72 is connected through a low pass filter, comprising a series resistor 73 (47K) and a capacitor 75 (220pF) to ground, to the non-inverting input of an op amp 76. The output of op amp 76 is connected through a resistor 77 (10K) to the base of an NPN transistor 78 (2N4401) having a collector connected to +8.5 volts and an emitter connected back to the inverting input. The emitter of transistor 78 is further connected through a resistor 80 (150) and capacitor 81 (0.27) in series to ground, as well as to the non-inverting inputs of op amps 82 and 83. Op amp 82 is connected as a voltage follower with negative unity feedback; and has an output connected to a voltage divider comprising resistors 85 (850) and 86 (1K), from the junction of which a peak pressure value PLV is obtained in a manner to be described. Op amp 83 has an inverting input connected to the output of op amp 76 and an output connected to a voltage divider comprising resistors 87 (850) and 88 (1K), from the junction of which a peak pressure location signal PPLOC is obtained in a manner to be described.

The non-inverting input of op amp 76 is connected to ground through a switch 90, which is one quarter of a quad electrically controlled solid state switch chip (4066). The inverting input of op amp 76 is connected to ground through a switch 91 which comprises another quarter of the chip. Both switches 90 and 91 are controlled by the output of a comparator 92 (2903) connected with a tie up resistor 93 (10K) from its output to +8.5 volts. The inverting input of comparator 92 is connected to +0.6 volts; and the non-inverting input is connected through a resistor 95 (10K) to ground and to a terminal which receives a WINDOW signal.

In operation, a WINDOW signal is generated by ignition control 11 as a high voltage level except during a predetermined combustion window of crankshaft rotation in which peak combustion pressure is expected, during which window a ground voltage is generated. When the window is not present, switches 90 and 91 are closed in response to comparator 92 to allow capacitors 75 and 81 to discharge to ground level and reset the circuit. When the window begins, switches 90 and 91 open; and the signal voltage is applied to op amp 76 through the low pass filter 73, 75, which has a high cutoff frequency to remove high frequency noise in the interest of better peak detection and which does not introduce any phase shift at the frequencies of the combustion pressure waveform. With transistor 78 conducting, the output of op amp 76 is at least one diode drop higher in voltage than the emitter of transistor 78, so that the output of op amp 83 goes low. Capacitor 81 charges to follow the voltage of the waveform upward. The voltage on capacitor 81 is fed back to op amp 76. Therefore, when the waveform reaches a peak and begins to decrease, the output of op amp 83 switches high to generate a leading edge pulse in signal PPLOC indicating the occurrence of peak pressure. The voltage on capacitor 81 stops increasing and remains essentially constant. Ignition control 11 includes means triggered by the PPLOC pulse to read a real time clock or crankshaft rotation value and store it in a memory location.

Another excursion of the pressure waveform at terminal 72 above the voltage stored on capacitor 81 causes the voltage on capacitor 81 to increase further and PPLOC to again go low. When a new peak is reached, PPLOC goes high again; and the old clock or crankshaft rotation value in ignition control 11 memory is replaced with a new one. The new high voltage remains on capacitor 81. This continues until the window is closed, at which time the stored clock or crankshaft rotation value is kept as the location of the final, and therefore highest, peak. The value of PLV may be read with each new peak and stored or read as a final value just before the end of the window. When the window ends, switches 90 and 91 are again closed to reset the circuit.

The diagnostic capabilities of this circuit are based on the fact that, in the highest wins arrangement of diodes 17, the combustion chamber which is currently firing and which thus produces the currently increasing pressure signal provides the highest voltage to its diode 17; and this voltage forward biases that diode and, through feedback to the operational amplifiers, reverse biases the diodes 17 of all the other interface circuits. Thus a signal of the currently firing cylinder is available if the cylinder can be identified. The diagnostic circuit of FIG. 4 provides this identification. Referring to FIG. 2, if a sensor other than sensor A has the highest output voltage, the voltage on common junction 18 fed back through resistor 66 to the inverting input of op amp 61 is too high for the signal input on the non-inverting input and thus causes the output of the op amp to decrease substantially. This reverse biases diode 17 for this op amp and sensor. Only a slight voltage difference (a few microvolts) between the common junction voltage and the input voltage is sufficient to produce the required voltage decrease at the output for reverse bias. The same thing happens to all the diodes 17 except for that associated with the sensor having the maximum signal voltage.

A logic circuit for detecting the forward biased diode is shown in FIG. 4. Op amps 100, 102 and 103 are provided at their inverting, non-inverting and non-inverting inputs, respectively, with signals A, C and D, respectively, from the anodes of diodes 17 in three of the four interface circuits 15. Signal A was described with reference to FIG. 2; and the others are analogous. There is no need for signal B in this optimized logic circuit, although alternative circuits, less optimal, which require B could be envisioned by one skilled in the art. The non-inverting input of op amps 100 and 101 and the inverting inputs of op amps 102 and 103 are connected to junction 18, so that op amps 100, 102 an 103 are placed across diodes 17 for interface circuits A, C and D. The inverting input of op amp 101 is connected to the output of op amp 102. The outputs of op amps 100 and 101 are connected through a resistor 105 (20K) to +5 volts and to both inputs of an OR gate 106 having an output labeled X. Since the op amps are of the open collector output type, this connection comprises an AND gate for the outputs of op amps 100 and 101. The outputs of op amps 102 and 103 are connected through resistors 107 and 108, respectively, to +5 volts and to the inputs of an OR gate 110 having an output labeled Y. The logic of the circuit is illustrated in the truth table of FIG. 5, in which the values of X and Y are shown for each sensor 12. The outputs X and Y may be read by ignition control 11 at a convenient time, such as TDC or the first peak thereafter; and the two bit code stored in memory.

With the information as to which cylinder is firing at any time, individual information may be compiled for each cylinder. Such information may include individual cylinder LPP, pressure rise and percent peak detects. From these statistics, the following failures can be deduced:

1. One cylinder's average LPP is at TDC while the others are later: misfire of the one cylinder.
2. A sensor serves two cylinders, but no peak detects are detected for one: misfire of the one.
3. A sensor serves two cylinders, but no peak detects are detected for either: bad sensor or connection.
4. With reference to additional information in ignition control 11, the wrong sensor is active during a given time: bad sensor or, if the sensor serves two cylinders and one gives good peak detects, misfire.
5. Indication of wrong sensor on several cylinders: out of sync or sensors connected improperly.

In general, a misfire will generate very low (advanced) LPP values, a bad sensor or connection will generate no peak detects and a good peak will show a noticeable rise in voltage from TDC to peak (low average LPP values excluded). The errors may be logged and indicated to the vehicle operator by means of malfunction codes. In addition, if a sensor or cylinder is found to be operating improperly, proper action can be taken to minimize any effect the defect may cause, such as leaving a misfiring cylinder out of control calculations, for example.

The part number DM124 given for various op amps in this specification is a Delco Electronics Corporation (R) number. An equivalent part is CA3260.

The embodiments of the invention in which an exclusive property or privilege is claimed are defined as follows:

1. A peak combustion pressure signal processing circuit for an internal combustion engine having a plurality of combustion chambers with combustion pressure sensors comprising, in combination:

an operational amplifier for each sensor having an input receiving a voltage derived from the sensor and an output connected through a diode to a common junction to produce a voltage representing the highest combustion pressure of the engine at the common junction, each operational amplifier further having a feedback circuit from the common junction to its input effective to cause its output voltage to decrease by more than a diode drop so as to reverse bias its output diode when the voltage on the common junction exceeds the voltage derived from the associated sensor, whereby only the diode passing the signal derived from the sensor sensing the maximum combustion pressure is forward biased and all the other diodes are reverse biased; and a logic circuit having inputs from the common junction and the outputs of at least all but one of the operational amplifiers, the logic circuit being effective to compare the voltage levels of the outputs of the operational amplifiers to the voltage on the common junction and thus determine which diode is forward biased, the logic circuit further defining a plurality of identifiable output states, one such state being unique to each diode being forward biased.

2. The peak combustion pressure signal processing circuit of claim 1 in which the input of each operational amplifier is a non-inverting input and each operational amplifier further has an inverting input with a DC reference voltage applied and a negative feedback resistor from the common junction to the inverting input, the feedback resistor comprising a feedback for the operational amplifier itself and the feedback circuit of claim 1.

3. The peak combustion pressure signal processing circuit of claim 1 in which the number of sensors, operational amplifiers and diodes is four each and the logic circuit comprises:

a first comparator having a first polarity input from the common junction, a second polarity input from the output of the first operational amplifier and an output;

a second comparator having a second polarity input from the common junction, a first polarity input from the output of the second operational amplifier and an output;

a third comparator having a second polarity input from the common junction, a first polarity input from the output of the third operational amplifier and an output;

a fourth comparator having a first polarity input from the common junction, a second polarity input from the output of the second comparator and an output;

AND gate means having inputs from the first and fourth comparators; and

OR gate means having inputs from the second and third comparators, the outputs of the AND and OR gate means indicating the output states.

* * * * *